(12) United States Patent
Coffman

(10) Patent No.: US 10,865,776 B2
(45) Date of Patent: *Dec. 15, 2020

(54) INTERNAL MOUNTED CYLINDRICAL TURBINE FOR ELECTRICITY GENERATION USING EXTERIOR FLUSH AND SCOOP INTAKES

(71) Applicant: The Boeing Company, Chicago, IL (US)

(72) Inventor: Mathew A. Coffman, Berkeley, MO (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/559,904

(22) Filed: Sep. 4, 2019

(65) Prior Publication Data

US 2019/0390653 A1    Dec. 26, 2019

Related U.S. Application Data

(63) Continuation of application No. 15/047,324, filed on Feb. 18, 2016, now Pat. No. 10,443,570.

(51) Int. Cl.
*F03D 9/25* (2016.01)
*F03D 9/45* (2016.01)
(Continued)

(52) U.S. Cl.
CPC .................. *F03D 9/25* (2016.05); *F03D 9/11* (2016.05); *F03D 9/34* (2016.05); *F03D 9/45* (2016.05);
(Continued)

(58) Field of Classification Search
CPC ....................................................... F03D 9/25
See application file for complete search history.

(56) References Cited

U.S. PATENT DOCUMENTS 4,070,131 A     1/1978 Yen
4,122,675 A *  10/1978 Polyak ..................... F03D 9/25
                                                                327/28
(Continued)

FOREIGN PATENT DOCUMENTS

CN         2382851 Y        6/2000
CN         101105081        1/2008
(Continued)

OTHER PUBLICATIONS

VWT Power Ltd., "About Small Wind," http://www.quietrevolution.com/about-small-wind/ (published prior to Feb. 18, 2016), 3 pages.
(Continued)

*Primary Examiner* — Tulsidas C Patel
*Assistant Examiner* — Joseph Ortega
(74) *Attorney, Agent, or Firm* — McDonnell Boehnen Hulbert & Berghoff LLP

(57) ABSTRACT

A method and system for generating electrical energy from wind are described. In an example, a method includes capturing wind in an intake on an exterior surface of a structure. The method also includes directing, via a duct, the wind from the intake to a centrifugal fan and, while directing the wind from the intake to the centrifugal fan, compressing and accelerating the wind in the duct. The method further includes receiving, in the centrifugal fan, the wind from the duct and rotating, via the received wind, a fan blade assembly in the centrifugal fan. The method still further includes generating electrical energy, via a generator, based on the rotation of the fan blade assembly.

20 Claims, 9 Drawing Sheets

(51) Int. Cl.
  *F03D 9/11* (2016.01)
  *F03D 9/34* (2016.01)
  *F03D 13/20* (2016.01)

(52) U.S. Cl.
  CPC ........ *F03D 13/20* (2016.05); *F05B 2210/403* (2013.01); *F05B 2240/13* (2013.01); *F05B 2240/9112* (2013.01); *Y02B 10/30* (2013.01); *Y02E 10/72* (2013.01); *Y02E 10/728* (2013.01)

(56) References Cited

U.S. PATENT DOCUMENTS

| | | | | |
|---|---|---|---|---|
| 4,144,802 | A * | 3/1979 | Babin | E04H 9/14 454/353 |
| 4,321,476 | A * | 3/1982 | Buels | F03D 1/02 290/55 |
| 4,452,046 | A | 6/1984 | Valentin | |
| 5,284,628 | A | 2/1994 | Prueitt | |
| 5,394,016 | A * | 2/1995 | Hickey | F03B 3/12 290/55 |
| 6,097,104 | A * | 8/2000 | Russell | F03D 9/008 290/54 |
| 8,232,665 | B2 * | 7/2012 | Sato | F03D 3/04 290/55 |
| 8,421,265 | B2 | 4/2013 | Gray | |
| 9,371,818 | B1 * | 6/2016 | Monto | F03D 3/0427 |
| 2003/0111843 | A1 * | 6/2003 | Tallal, Jr. | F03D 13/20 290/55 |
| 2006/0016182 | A1 | 1/2006 | Comandu et al. | |
| 2006/0071086 | A1 * | 4/2006 | Kates | F24F 11/62 236/1 B |
| 2006/0108809 | A1 | 5/2006 | Scalzi | |
| 2008/0179053 | A1 * | 7/2008 | Kates | F24F 3/044 165/208 |
| 2008/0188174 | A1 * | 8/2008 | Aminpour | F03D 1/04 454/309 |
| 2010/0001532 | A1 * | 1/2010 | Grumazescu | F03D 1/02 290/55 |
| 2010/0060010 | A1 * | 3/2010 | Gaportsin | F03D 9/007 290/55 |
| 2010/0133847 | A1 | 6/2010 | Allaei | |
| 2010/0230973 | A1 * | 9/2010 | Ortiz | B60K 16/00 290/55 |
| 2010/0237627 | A1 * | 9/2010 | Socolove | F03D 9/00 290/55 |
| 2010/0247302 | A1 * | 9/2010 | Suma | F03D 3/0427 415/182.1 |
| 2010/0257795 | A1 * | 10/2010 | Pagliasotti | E04F 13/007 52/173.1 |
| 2011/0021133 | A1 * | 1/2011 | Zwern | C02F 1/04 454/338 |
| 2011/0021134 | A1 * | 1/2011 | Zwern | C02F 1/04 454/343 |
| 2011/0095538 | A1 * | 4/2011 | Tabe | F03D 9/008 290/55 |
| 2011/0133468 | A1 * | 6/2011 | Leith | F03D 3/002 290/55 |
| 2011/0291421 | A1 * | 12/2011 | Tsung | F03D 3/0409 290/55 |
| 2012/0080884 | A1 * | 4/2012 | Gagnon | F03D 3/005 290/55 |
| 2012/0121379 | A1 | 5/2012 | Chio | |
| 2012/0124985 | A1 * | 5/2012 | Lei | F03D 3/005 60/398 |
| 2012/0292916 | A1 | 9/2012 | Wang | |
| 2013/0305642 | A1 | 11/2013 | Propsi | |
| 2014/0062092 | A1 | 3/2014 | Stausgaard | |
| 2014/0062093 | A1 * | 3/2014 | Allaei | F03D 1/04 290/55 |
| 2014/0084591 | A1 * | 3/2014 | Baker | F03D 9/35 290/55 |
| 2014/0125065 | A1 | 5/2014 | Son et al. | |
| 2014/0150362 | A1 * | 6/2014 | Propst | B32B 5/26 52/309.12 |
| 2014/0265335 | A1 * | 9/2014 | Andreis | B63B 1/32 290/52 |
| 2014/0284928 | A1 * | 9/2014 | Mital | F03D 3/02 290/52 |
| 2014/0369826 | A1 * | 12/2014 | Rohring | F03D 1/04 415/207 |
| 2015/0084341 | A1 * | 3/2015 | Berry | F03D 3/0418 290/55 |
| 2015/0211489 | A1 * | 7/2015 | Dakhil | B01D 53/02 290/50 |
| 2015/0345472 | A1 | 12/2015 | Chowdhury | |
| 2016/0047360 | A1 * | 2/2016 | Fex, Jr. | F03D 1/04 415/1 |
| 2016/0084227 | A1 * | 3/2016 | Krippene | F03D 9/39 290/55 |
| 2016/0281679 | A1 | 9/2016 | Wichers et al. | |
| 2017/0130696 | A1 * | 5/2017 | Samarasinha | F03D 3/02 |
| 2017/0241406 | A1 | 8/2017 | Coffman | |
| 2017/0250626 | A1 * | 8/2017 | Barlot | H02N 2/185 |
| 2018/0058463 | A1 * | 3/2018 | Rollins | F04D 25/0606 |
| 2019/0024633 | A1 * | 1/2019 | Blanco | F03D 3/0418 |
| 2019/0154284 | A1 * | 5/2019 | Teoh | F24F 11/0001 |
| 2020/0149260 | A1 * | 5/2020 | Pamula | F03D 9/34 |

FOREIGN PATENT DOCUMENTS

| | | |
|---|---|---|
| CN | 102146711 | 8/2011 |
| DE | 102007013885 | 9/2007 |
| DE | 102008038895 | 2/2010 |

OTHER PUBLICATIONS

The Burnham Plan Centennial, "Clean Tech Tower," http://burnhamplan100.lib.uchicago.edu/big_bold_visionary/towers/clean_tech_tower/ (published prior to Feb. 18, 2016), 2 pages.
Chino, Mike, "Smooth Operator: The Clean Technology Tower," http://inhabitat.com/smooth-operator-the-clean-technology-tower/ (published prior to Feb. 18, 2016), 5 pages.
Takahashi, Masayuki, "Characteristics of Centrifugal Blower and Its Effective Use in High Static Pressure Area,", Oriental Motor, RENGA No. 162, (published prior to Feb. 18, 2016), 6 pages.
"Solar Aero's Bladeless Wind Turbine," Free Republic, http://www.freerepublic.com/focus/news/2562328/posts/ (published prior to Feb. 18, 2016), 9 pages.
Chapter 5, "Fans and Blowers," Bureau of Energy Efficiency, (published prior to Feb. 18, 2016), pp. 93-112.
English Translation of Abstract of German Patent Application No. 102007013885 dated Oct. 10, 2017.
English Translation of Abstract of German Patent Application No. 102008038895 dated Oct. 10, 2017.
English Translation of Abstract of Japanese Patent Application No. 2011-174447 dated Oct. 10, 2017.
Extended European Search Report issued in European Patent Application No. 17156458.6 dated Jul. 14, 2017.
Examination Search Report prepared by the Canadian Patent Office in application No. 2,954,987 dated Nov. 20, 2019.
Notification of First Office Action issued by the Chinese Patent Office in application No. 2017100850033, dated Oct. 9, 2019, English translation included.

* cited by examiner

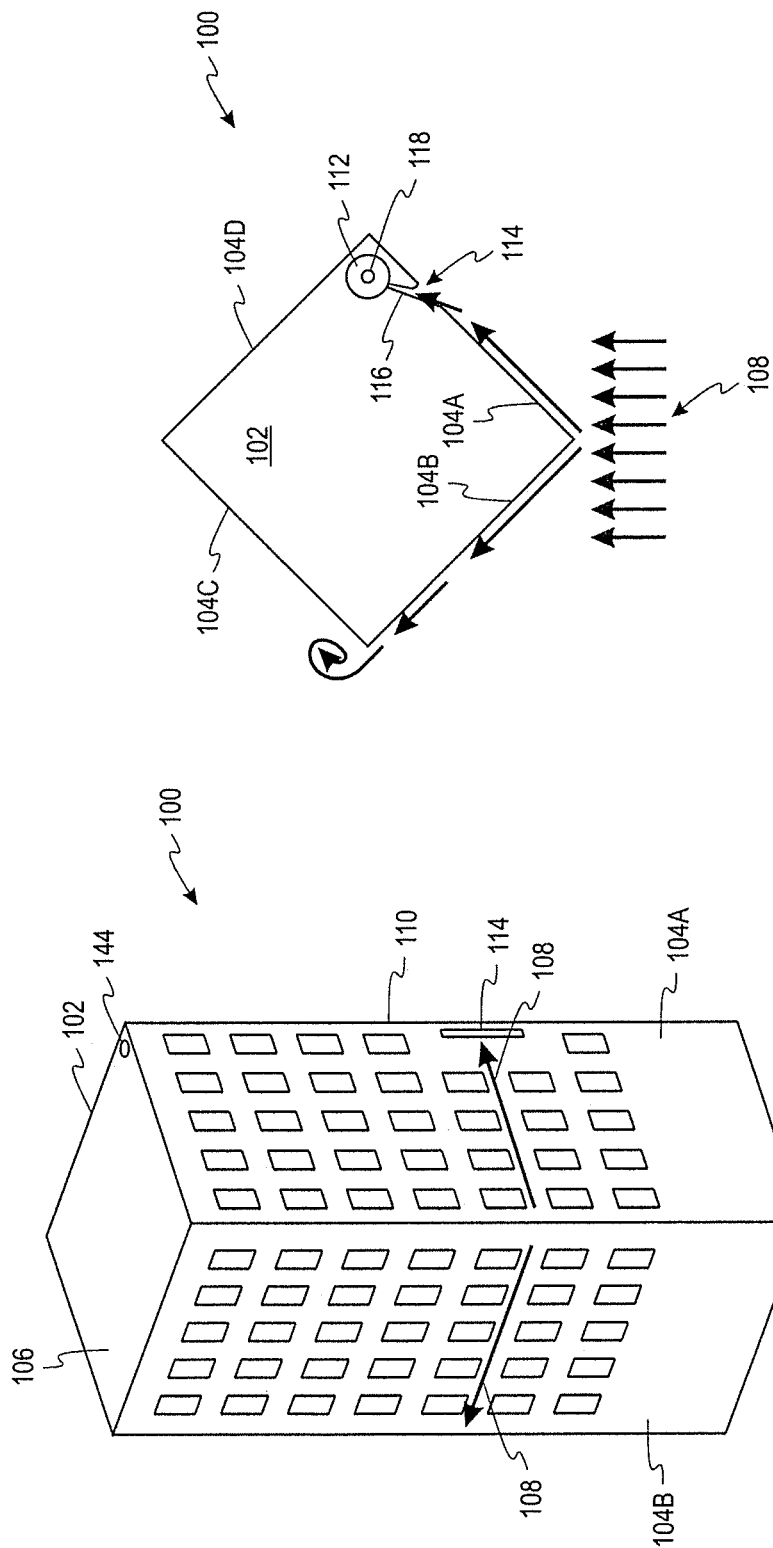

INTERNAL MOUNTED CYLINDRICAL TURBINE FOR ELECTRICITY GENERATION USING EXTERIOR FLUSH AND SCOOP INTAKES

CROSS REFERENCE TO RELATED APPLICATION

The present disclosure claims priority to and is a continuation of U.S. application Ser. No. 15/047,324, filed on Feb. 18, 2016, the entire contents of which are herein incorporated by reference.

BACKGROUND

Unless otherwise indicated herein, the materials described in this section are not prior art to the claims and are not admitted to be prior art by inclusion in this section.

There is considerable interest in generating electrical power from renewable energy sources such as, for example, wind. Conventional wind power generation systems are typically provided in the form of propeller-type turbines, commonly referred to as windmills. In general, such systems include a plurality of long propeller blades mounted atop a tall tower. When located in areas having sufficient wind velocity, the kinetic energy of the wind turns the propeller blades around a rotor. The rotor is coupled to a main shaft, which spins a generator to create electrical energy.

Conventional wind power generation systems have a number of limitations. For example, conventional wind power generation systems generally require large open spaces with relatively large wind velocities. Additionally, for example, conventional wind power generation systems can be noisy, impact environmental aesthetics, and impact wildlife.

BRIEF SUMMARY

A method and system for generating electrical energy from wind is disclosed. In an example, a method for generating electrical energy from wind includes capturing wind in an intake on an exterior surface of a structure. The method also includes directing the wind, via a duct, from the intake to a centrifugal fan and, while directing the wind from the intake to the centrifugal fan, compressing and accelerating the wind in the duct. The method further includes receiving, in the centrifugal fan, the wind from the duct and rotating, via the received wind, a fan blade assembly in the centrifugal fan. The method still further includes generating electrical energy, via a generator, based on the rotation of the fan blade assembly.

In another example, a system for generating energy from a wind load on a structure includes an intake on an exterior surface of the structure. The intake is configured to capture wind on the exterior surface. The system also includes a duct coupled to the intake at a first end of the duct. The duct is configured to direct the wind from the first end to a second end of the duct. The duct is also configured to compress and accelerate the wind directed from the first end to the second end. The system further includes a centrifugal fan coupled to the second end of the duct for receiving the wind from the duct. The centrifugal fan includes a fan blade assembly configured to rotate responsive to the wind received from the duct. The system also includes a generator configured to generate electrical energy based on the rotation of the fan blade assembly.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 1 depicts a perspective view of a wind power generation system according to an example.

FIG. 2 depicts a sectional top view of the example wind power generation system of FIG. 1.

DETAILED DESCRIPTION

The disclosed methods and systems provide for generating electrical energy from a wind load on a structure, e.g., a building, a bridge, and/or a tower. Although examples are shown in the Figures and described below in the context of a building, it will be understood that principles of the disclosure can extend to apply in other structures such as, for example, a bridge or a tower.

Figure 3:
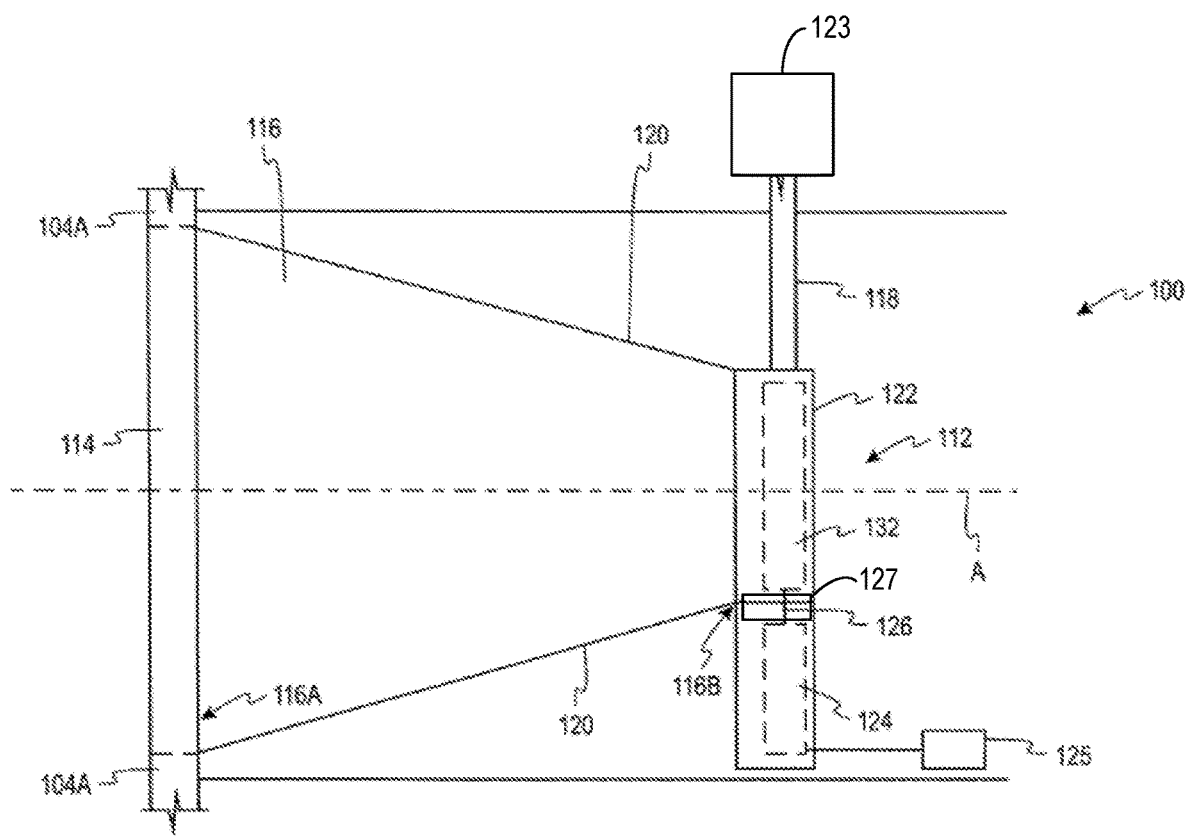
FIG. 3 depicts a sectional side view of the example wind power generation system of FIG. 1.

FIGS. 1-3 depict a wind power generation system 100 according to an example of the disclosure. To more clearly depict aspects of the power generation system 100, FIGS. 1-3 are not to scale relative to each other. As shown in FIG. 1, the power generation system 100 includes a building 102 having a plurality of exterior, lateral surfaces 104A-104D and a roof 106. The building 102 can be, for example, a single-family house, a low-rise building, a mid-rise building, and/or a high-rise building utilized for commercial, industrial, and/or residential purposes.

FIG. 1 further shows example wind 108 incident on and traversing the exterior surfaces 104A, 104B of the building 102. In general, when the wind 108 encounters the exterior surfaces 104A, 104B of the building 102, the wind 108 is forced along the exterior surfaces 104A, 104B towards respective corners 110 of the building 102. Additionally, due at least in part to air pressure differences at the corners 110, the wind 108 accelerates as it traverses along the exterior surfaces 104A, 104B toward the corners 110. The wind incident on and traversing an exterior surface of a building may also be referred to as a wind load on that exterior surface of the building.

The power generation system 100 advantageously captures such wind loads on the exterior surface 104A and directs the captured wind 108 to a wind turbine 112 in an interior of the building 102 to generate electrical energy. To capture wind 108 incident on and traversing the exterior surface 104A of the building 102, the power generation system 100 includes an intake 114 on the exterior surface 104A. As shown in FIG. 2, the intake 114 provides an opening through which the wind 108 can pass from the exterior, lateral surface 104A into an interior space of the building 102. The intake 114 can have a size and shape that facilitates directing the wind 108 into the building 102 with reduced (or minimal) air flow resistance. Example implementations of the intake 114 are described below with respect to FIGS. 5-6.

In the example shown in FIGS. 1-2, the building 102 includes a single intake 114 on one exterior surface 104A; however, as will be described below, the building 102 can include multiple intakes 114 on one or more exterior surfaces 104A-104D of the building 102 in other examples. Doing so can facilitate the power generation system 100 capturing greater amounts of wind 108 and thus generating greater amounts of electrical energy.

As shown in FIGS. 2-3, the intake 114 is coupled to the wind turbine 112 via an air duct 116. The air duct 116 includes one or more walls 120 extending between a first end 116A coupled to the intake 114 and a second end 116B coupled to the wind turbine 112. The one or more walls 120 of the air duct 116 substantially or fully enclose an inner space within the air duct 116. As such, the air duct 116 provides a conduit for directing captured wind 108 from the intake 114 to the wind turbine 112. In examples, the air duct 116 can have a circular, a rectangular, a square, and/or a polygonal cross-sectional shape.

According to aspects of the disclosure, the air duct 116 compresses and accelerates the wind 108 as it flows from the intake 114 to the wind turbine 112. To do so, the air duct 116 includes one or more tapered sections, which taper inwardly toward an axis "A" of the air duct 116 from the intake 114 to the wind turbine 112. In FIGS. 2-3, the air duct 116 tapers continuously along an entire distance of the air duct 116. Tapering the air duct 116 over the entire distance of the air duct 116 can help to reduce the angle of taper needed to achieve a particular extent of wind compression and acceleration, which in turn can help minimize air flow losses. However, in other examples, the air duct 116 can include one or more non-tapered sections in which the cross-sectional dimensions of the air duct 116 remain fixed over at least a portion of the air duct 116. More generally, the air duct 116 can be configured such that cross-sectional dimensions of the air duct 116 are greater at the first end 116A than at the second end 116B and, in some implementations, greatest at the first end 116A and smallest at the second end 116B. The duct 116 thus acts as a fluid mechanics nozzle to compress and accelerate the wind 108.

By compressing and accelerating the wind 108, the air velocity and thereby flow energy density is increased. This allows for more efficient electrical energy generation by the wind turbine 112 described below. Additionally, compressing and accelerating the wind 108 via the duct 116 can provide for more efficient use of interior space within the building 102.

The air duct 116 can have a linear taper of varying degrees and shapes for modifying the amount of wind 108 compression and/or acceleration. In an example, the air duct 116 can have a linear taper of approximately 20 degrees. The air duct 116 can be continuously tapered using a multi-power polynomial taper shape using a complex computational fluid dynamics (CFD) algorithm. Still other examples are also possible.

Figure 10:
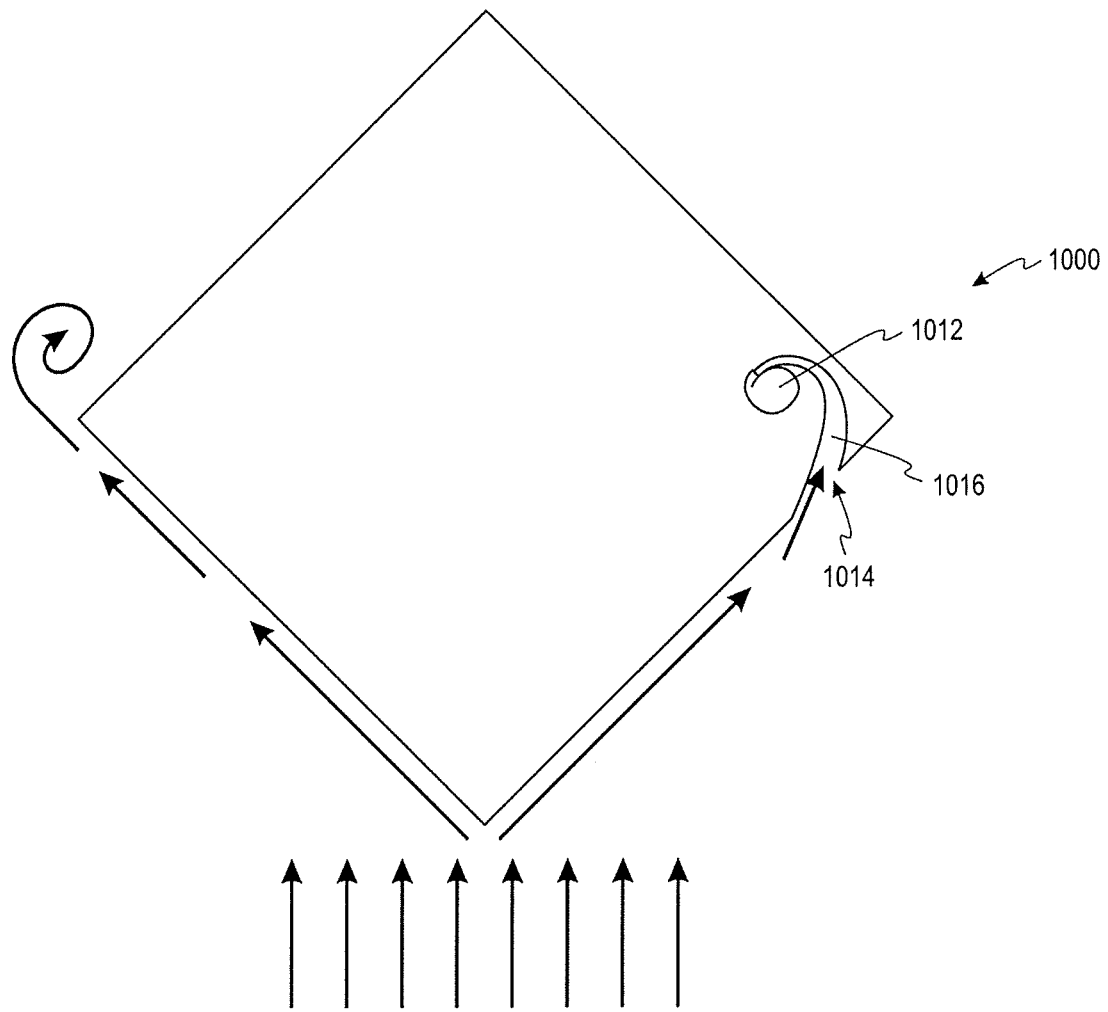
FIG. 10 depicts a sectional top view of an example wind power generation system.

In FIGS. 2-3, the air duct 116 is shown as a straight run between the intake 114 and the wind turbine 112. That is, the air duct 116 does not include any elbows or turns. This can beneficially reduce or mitigate air flow resistance within the air duct 116. Optionally, the air duct 116 can include one or more elbows or turns to provide greater flexibility in the relative positioning between the intake 114 and the wind turbine 112 in the building 102. For instance, FIG. 10 illustrates an example power generation system 1000 including a duct 1016, which turns between an intake 1014 and a wind turbine 1012.

As described above, the wind turbine 112 is coupled to the second end 116B of the air duct 116. The wind turbine 112 converts the kinetic energy of the wind 108 received from the duct 116 into electrical energy. To do so, the wind turbine 112 includes a centrifugal fan 122 coupled to an electric generator 124. In particular, the wind 108 received in the wind turbine 112 rotates a fan blade assembly 132 in the centrifugal fan 122, which causes the electric generator 124 to generate electrical energy. For example, the fan blade assembly 132 can be coupled to the electric generator 124 by a shaft 126 such that rotation of the fan blade assembly 132 rotates the shaft 126, which in turn rotates a rotor within a stator of the electric generator 124 to generate electric energy. The fan blade assembly 132 and the rotor can rotate at the same speed (e.g., in a direct-drive configuration). The wind turbine 112 can also include a gearbox (not shown) to step-up and/or step-down a speed of rotational coupling between the centrifugal fan 122 and the electric generator 124.

Utilizing the centrifugal fan 122 to convert the kinetic energy of the wind 108 to electrical energy provides a number of benefits. For example, the fan blades of a centrifugal fan 122 provide a greater surface area per volume for the wind to act on relative to propeller-type turbines conventionally used for wind power generation. As a result, the wind turbine 112, which has the centrifugal fan 122, can generate electrical energy at lower wind speeds than similarly sized propeller-type wind turbines. Additionally, for example, a centrifugal fan 122 may be quieter to operate than a propeller-type wind turbine as air turbulence and turbine efficiencies directly relate to fan noise.

According to aspects of the disclosure, the electrical energy generated by the wind turbine 112 can be provided to an electrical network within the building 102, an electrical power grid external to the building 102, and/or one or more energy storage devices 125 such as, for example, one or more rechargeable batteries, thermal storage devices (e.g., molten salts), flywheels, and/or superconducting magnetic coils. Thus, the generated electrical energy can be used to operate electrical devices within the building 102 and/or stored for later use by such devices.

As shown in FIG. 3, the wind turbine 112 is further coupled to an exhaust duct 118, which facilitates egress of the wind 108 from the power generation system 100. As the wind 108 passes through the centrifugal fan 122, the wind 108 turns 90 degrees and exits the centrifugal fan 122 via the exhaust duct 118. The exhaust duct 118 can direct the wind 108 from the centrifugal fan 122 to an exhaust opening 144 in the building 102. For instance, in FIG. 1, the exhaust opening 144 is on the roof 106; however, the exhaust opening 144 can be in different locations in other examples.

Optionally, the exhaust duct 118 can be coupled to a heating, ventilating, and air conditioning (HVAC) system 123 in the building 102. In this way, the wind 108 exhausted from the power generation system 100 can be used to improve air flow in the HVAC system 123. This may, for example, mitigate the need for booster fans in the HVAC system 123.

Figure 4A:
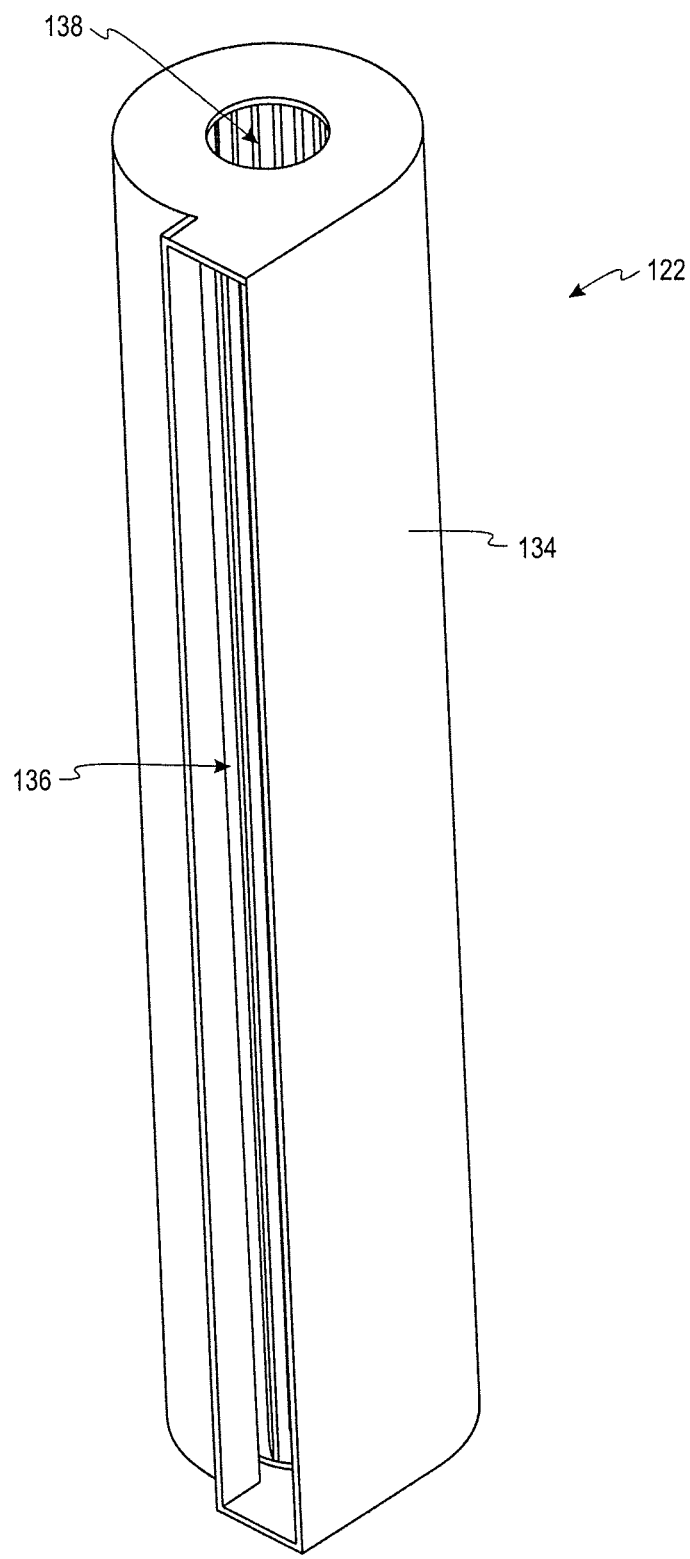
FIG. 4A illustrates a perspective view of a centrifugal fan according to an example.

As described above, the wind turbine 112 includes a centrifugal fan 122. FIG. 4A illustrates a centrifugal fan 122 according to one example. The centrifugal fan 122 includes a fan blade assembly 132 in a housing 134. The housing 134 has an inlet 136 for receiving wind 108 from the air duct 116 and an outlet 138 for exhausting air to the exhaust duct 118. As shown in FIG. 4A, the inlet 136 is generally perpendicular to the outlet 138.

Figure 4B:
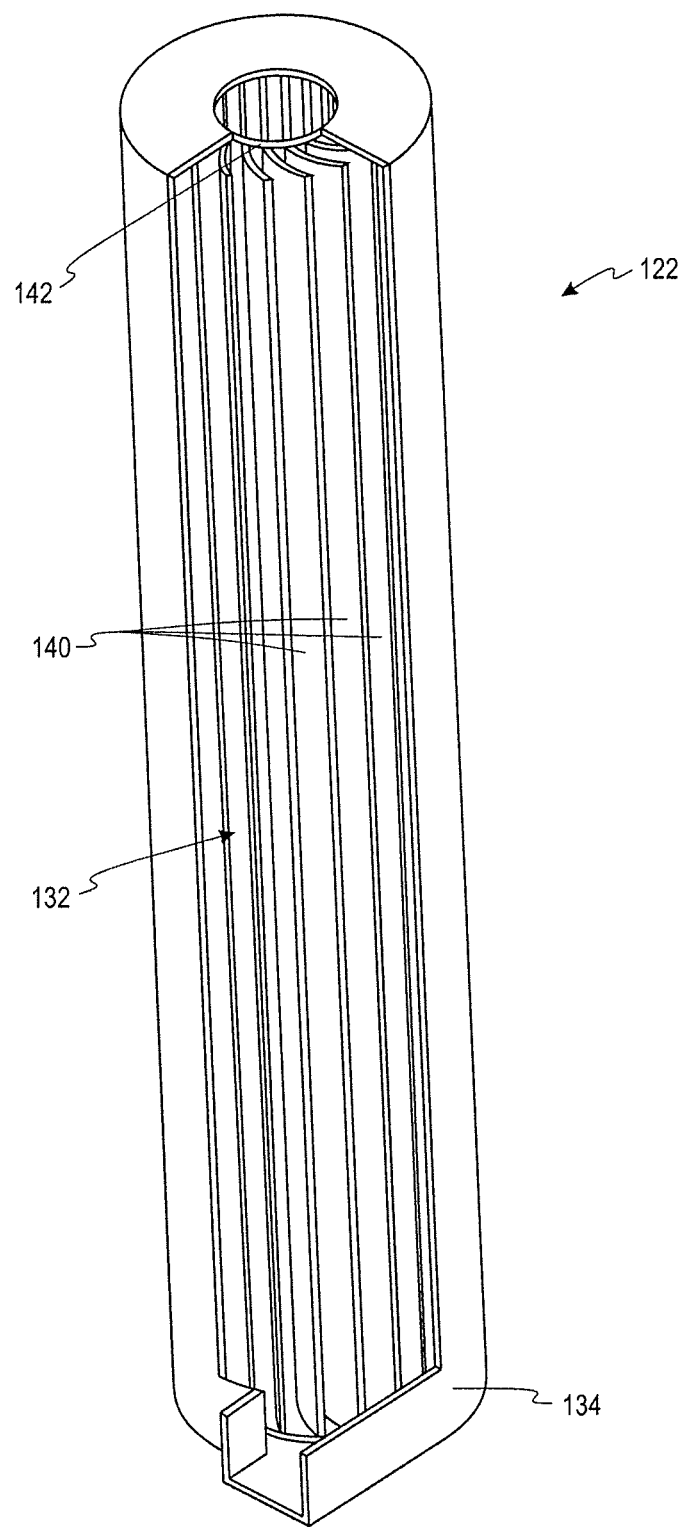
FIG. 4B illustrates a partial view of the example centrifugal fan depicted in FIG. 4A.

FIG. 4B depicts the centrifugal fan 122 of FIG. 4A with a portion of the housing 134 removed to expose the fan blade assembly 132. As shown in FIG. 4B, the fan blade assembly 132 includes a plurality of fan blades 140 coupled to a hub 142. In FIG. 4B, each of the fan blades 140 curves against a direction of rotation of the fan blade assembly 132 (i.e., in a "backward-curved" configuration). Alternatively, the fan blades 140 can curve in the direction of rotation of the fan blade assembly 132 (i.e., in a "forward-curved" configuration) or the fan blades 140 can extend from the hub 142 without curving (i.e., in a "straight radial" configuration). A fan blade assembly 132 having a backward-curved configuration can provide for greater efficiency than a forward-curved configuration or a straight radial configuration in some implementations.

As described above, when wind 108 enters the inlet 136 from the air duct 116, the wind 108 acts on the fan blades 140 of the fan blade assembly 132. In particular, the wind 108 causes the fan blade assembly 132 to rotate within the housing 134. The rotational energy of the fan blade assembly 132 is transferred to the generator 124 (e.g., via the shaft 126), which converts the rotational energy into electrical energy. Rotation of the fan blades 140 further applies a centrifugal force to the wind 108, which forces the wind 108 out of the housing 134 via the outlet 138.

In the illustrated example, the outlet 138 is coaxial with an axis of rotation of the fan blade assembly 132 and the inlet 136 is perpendicular to that axis of rotation. However, the wind 108 can be received via the outlet 138 shown in FIG. 4A and exhausted via the inlet 136. That is, the wind 108 can be received from the air duct 116 through an opening parallel to the axis of rotation of the fan blade assembly 132 and exhaust the wind 108 perpendicular to the axis of rotation of the fan blade assembly 132.

The centrifugal fan 122 can also optionally include a brake system 127 to facilitate safe maintenance, repair, and/or upgrading of the power generation system 100. The brake system 127 can have a first state of operation in which the brake system is disengaged from the fan blade assembly 132 to allow rotation of the fan blade assembly 132, and a second state of operation in which the brake system 127 is engaged with the fan blade assembly 132 to stop or prevent rotation of the fan blade assembly 132. In this way, the brake system 127 can be selectively actuated between the first and second states to facilitate safe repair and/or maintain the power generation system 100.

Figure 6:
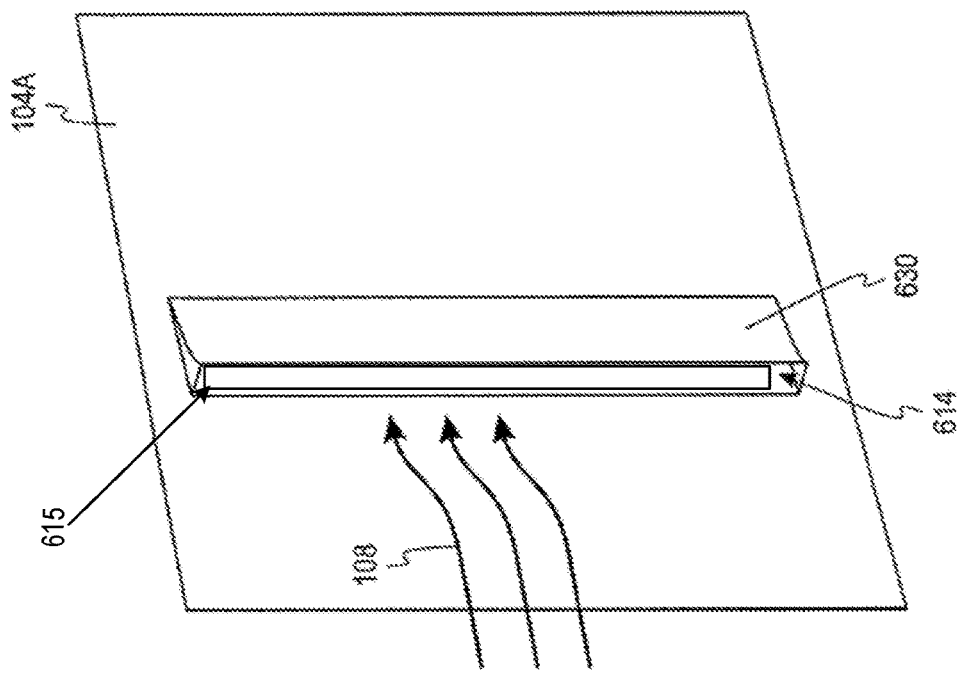
FIG. 6 depicts a perspective view of an example intake of the wind power generation system.
Figure 5:
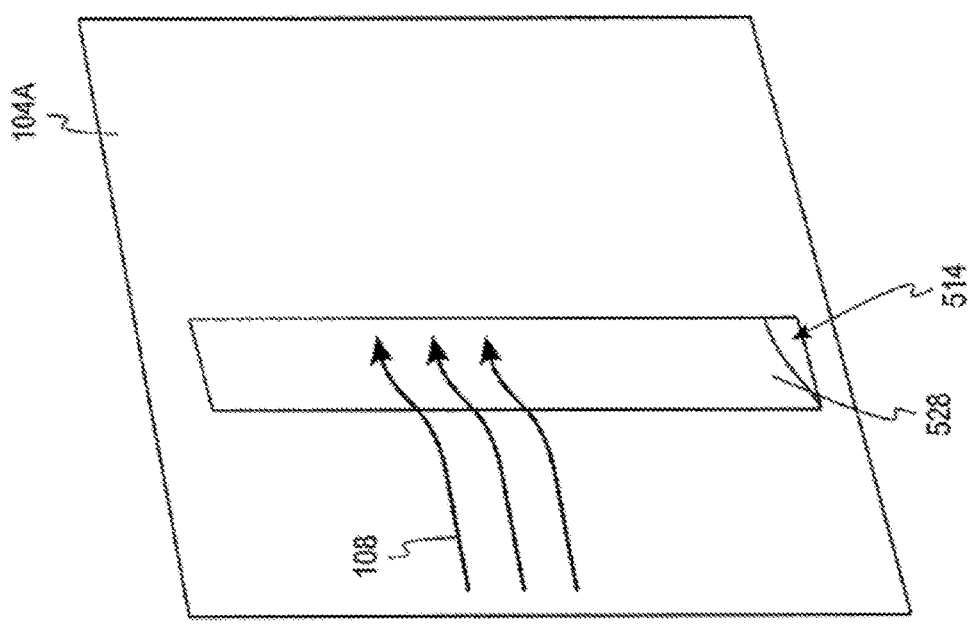
FIG. 5 depicts a perspective view of an example intake of the wind power generation system.

As described above, the intake 114 captures wind incident on and traversing the exterior surface 104A of the building 102. FIGS. 5-6 depict example configurations for the intake 114, which can be utilized in the power generation systems described herein (e.g., the power generation system 100). FIG. 5 depicts an example intake 514 on the exterior surface 104A of the building 102. As shown in FIG. 5, the intake 514 is formed as a recessed opening in the exterior surface 104A. In particular, the intake 514 has an inwardly sloping surface 528, which forms the recessed opening in the exterior surface 104A. As further shown in FIG. 5, when the wind 108 traversing the exterior surface 104A encounters the intake 514, the wind 108 flows through a gap between the surface 528 and the surface 104A to then pass into the duct 116.

In FIG. 5, the intake 514 is flush with the exterior surface 104A as no portion of the intake 514 protrudes outwardly from the exterior surface 104A. By having a recessed intake 514, the intake 514 may have little or no negative impact on the aesthetics of the building 102. This may help to reduce or eliminate a significant barrier to deploying wind power generation systems in buildings and urban environments.

As shown in FIG. 6, the intake 614 includes a scoop 630 that protrudes from the exterior surface 104A to facilitate capturing greater amounts of wind compared to a recessed-type intake 514. While a scoop-type intake 614 may improve wind capture functionality, the protruding scoop may be more noticeable to observers than a recessed-type intake 514. Yet, relative to the substantial space and size requirements of conventional propeller-type wind turbines, the scoop 130 is relatively small and less likely to impact building aesthetics.

Optionally, the intake 114 can include aspects of both the recessed-type intake 514 and the scoop-type intake 614. For example, the intake 114 can include both an inwardly sloping surface (e.g., the surface 528) and a scoop (e.g., the scoop 630).

According to some aspects, the system 100 can also include an intake filter 615 that is configured to inhibit solid objects (such as, for example, birds, bats, insects, plastic bags, and garbage) from entering the intake 114, 514, 614. As examples, the intake filter 615 can include a grating, a mesh, netting, combinations thereof, and/or the like. Accordingly, the power generation systems of this disclosure may mitigate environmental impacts associated with collisions with conventional propeller-type wind turbines.

In the illustrated examples, the intakes 114, 514, and 614 are depicted as generally elongated in shape. This may help to capture greater amounts of wind load on the surfaces of the buildings using less (or minimal) interior space within the building 102. However, the intakes 114, 514, 614 can be formed in other shapes according to other examples. Additionally, the intakes 114, 514, and 614 may be oriented in any configuration relative to the vertical axis of the building. While the intakes 114, 514, and 614 are generally shown oriented parallel to a vertical axis of the building, the intakes 114, 514, and 614 can be oriented differently relative to the vertical axis of the building.

Figure 7:
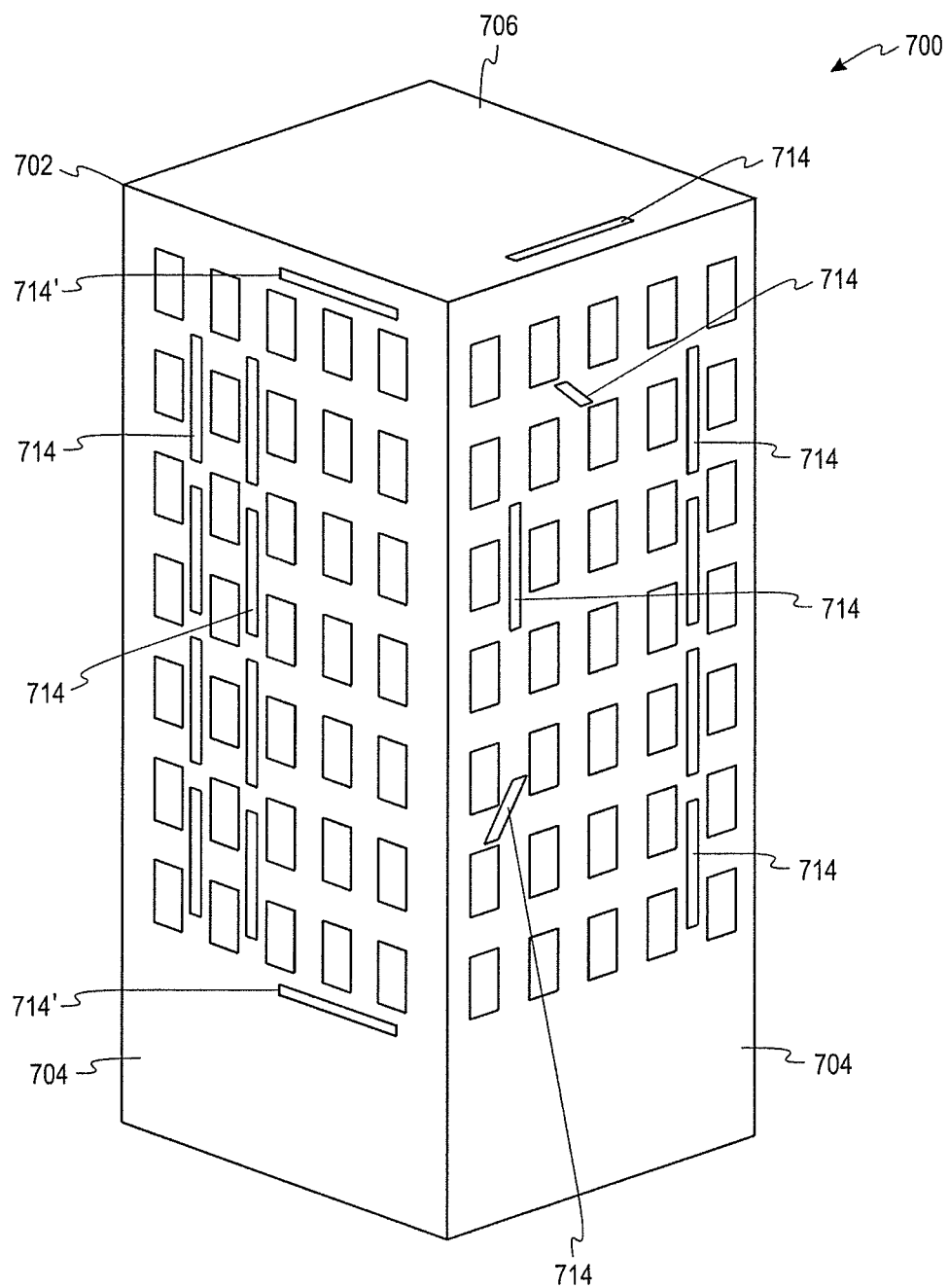
FIG. 7 depicts a perspective view of an example wind power generation system.

In FIG. 1, the intake 114 is located at a corner 110 of the building 102. Locating the intake 114 at a corner 110 of the building 102 can advantageously facilitate capturing greater wind loads in the intake 114 relative to other locations on the exterior surface 104 (e.g., due to wind 108 accumulating and traversing over a greater surface area of the exterior surface 104); however, the intake 114 can be in different locations on the exterior surface 104 as shown in FIG. 7. Additionally, although the building 102 includes only one intake 114, duct 116, and wind turbine 112 in FIGS. 1-3, the building 102 can include more than one intake 114, duct 116, and/or wind turbine 112. Integrating multiple intakes 114, ducts 116, and wind turbines 112 into the building 102 can provide for capture of greater wind loads on the building 102 and, thus, greater electrical energy generation.

As noted above, the wind power generation system 100 can include any number of intakes 114, ducts 116, and wind turbines 112 in any location on any surface of the building 102. As an example of this, FIG. 7 depicts a power generation system 700 in which a building 702 includes multiple intakes 714 at various locations on exterior surfaces 704 of the building 702. Also, in FIG. 7, one of the intakes 714 is located on a roof 706 of the building 702. As shown in FIG. 7, the size and orientation of at least some intakes 714 differs relative to other ones of the intakes 714. Also, as shown in FIG. 7, intakes 714' are located and oriented so as to capture an updraft and a downdraft, respectively, on one of the exterior surfaces 704. The number, location, size, and orientation of the intakes 714, 714' can be based on factors such as, for example, expected wind loads, space constraints within the building 702 interior, and/or electrical energy generation needs of the building 702. Although not shown, the system 700 can further include multiple ducts, wind turbines, and exhaust ducts each coupled to a respective one of the intakes 714 in a manner similar to that described above.

As illustrated and described above, each wind turbine receives wind from a single duct and a single intake; however, according to additional or alternative examples, a single wind turbine can receive wind from multiple ducts and/or multiple intakes. In such examples, the system can include one or more features configured to facilitate mixing of the wind received the different ducts and/or intakes so as to mitigate resistance and/or other loses. For example, the system can include one or more directional slats in the air duct, which help to reduce turbulence of air flow between the multiple air streams. By directing wind from multiple intakes and/or ducts to a common wind turbine, even greater amounts of wind can be captured and directed to the wind turbine. This may help to achieve more efficient utilization of space within the building for power generation.

As described above, the power generation systems of the present disclosure are generally located in an interior space of the building 102. This provides a number of additional benefits and advantages over conventional propeller-type systems. For example, because the wind turbine(s) are located in an interior space of the building 102, the power generation systems of this disclosure address environmental impacts associated with conventional propeller-type wind turbines (e.g., wildlife colliding with propellers). Additionally, by locating the components of the power generation systems in an interior space of the building 102, the systems can be easily, safely, and cost-efficiently repaired, serviced, and/or upgraded from that interior space of the building 102. By contrast, conventional windmills are required to be placed in open spaces exposed to potentially harsh and/or hazardous environmental conditions. Further still, locating the components of the power generation systems in the building 102 helps to maintain building aesthetics.

Figure 8:
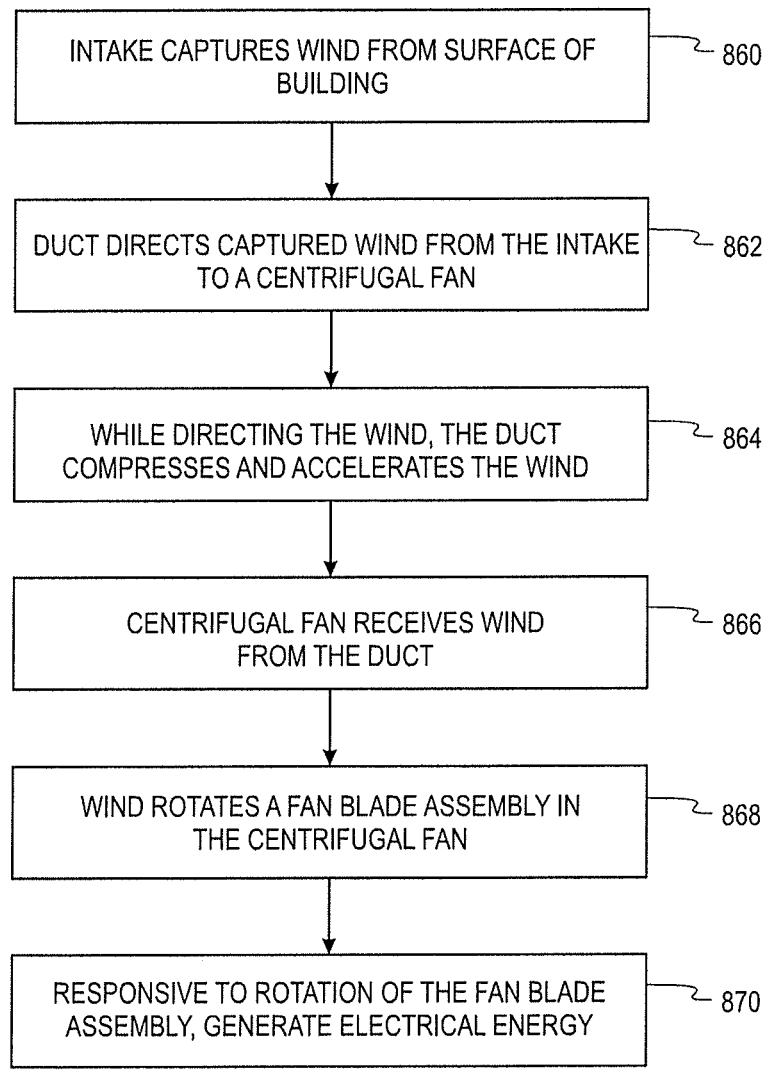
FIG. 8 depicts a flow chart for a method of generating electrical energy from wind according to an example.

Referring now to FIG. 8, a flow chart for an example method of generating electrical energy from wind is depicted. At block 860, an intake captures wind on an exterior, lateral surface of a building. At block 862, a duct directs the captured wind from the intake to a centrifugal fan. At block 864, while directing the wind from the intake to the centrifugal fan, the duct compresses and accelerates the wind. At block 866, after the wind has been compressed and accelerated in the duct, the centrifugal fan receives the wind from the duct. At block 868, the wind rotates a fan blade assembly in the centrifugal fan. At block 870, responsive to the rotation of the fan blade assembly, electrical energy is generated.

The flow chart illustrated in FIG. 8 is one example of a method for generating electrical energy from wind. The method of electrical energy generation can omit steps, include additional steps, and/or modify the order of steps presented above.

Figure 9:
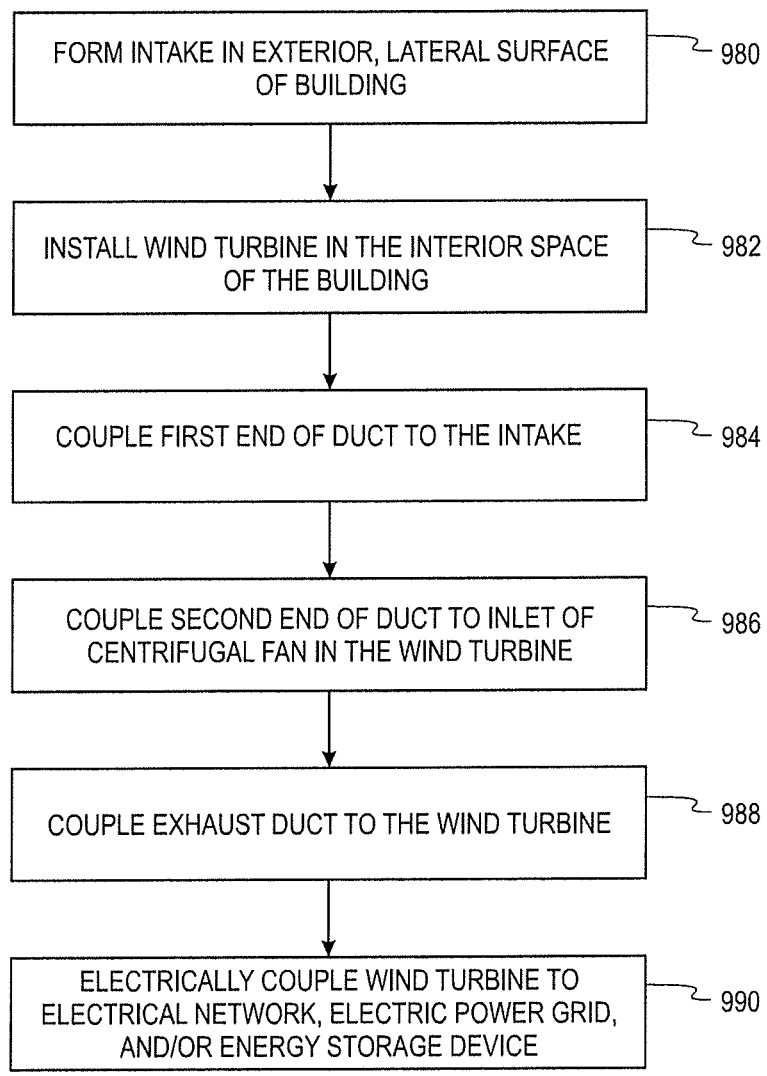
FIG. 9 depicts a flow chart for a method of installing a wind power generation system in a structure according to an example.

Referring now to FIG. 9, a flow chart for an example method of installing a wind power generation system in a building is depicted. In some implementations, the method may be carried out to retrofit an existing building with the wind power generation system. Alternatively, the method may be carried out concurrent with construction of the building.

At block 980, the method involves forming an intake in an exterior, lateral surface of the building. The intake can be formed, for example, by forming an opening in the exterior, lateral surface of the building. The opening can be sloped downwardly from the exterior, lateral surface of the building so as to provide a recessed intake. Optionally, forming the intake can include coupling a scoop to the exterior surface at the opening.

At block 982, a wind turbine is installed in an interior space of the building (e.g., a maintenance room). At block 984, a first end of the duct is coupled to the intake. At block 986, a second of the duct is coupled to the wind turbine. In particular, the second of the duct can be coupled to an inlet of a centrifugal fan in the wind turbine. At block 988, an outlet of the wind turbine is coupled to an exhaust duct configured to facilitate egress of the wind from the interior space in the building. At block 990, a generator of the wind turbine is electrically coupled to an electrical network of the building, an electric power grid external to the building, and/or an energy storage device.

The flow chart illustrated in FIG. 9 is one example of a method for installing a wind power generation system in a building. The method of installation can omit steps, include additional steps, and/or modify the order of steps presented above.

Example aspects have been described above. After studying the configurations, examples, and arrangements described herein a skilled person may come to understand, however, that changes and modifications may be made without departing from the true scope and spirit of the disclosure. The description of the different advantageous aspects has been presented for purposes of illustration and description, and is not intended to be exhaustive or limited to the form disclosed. After reviewing this disclosure, many modifications and variations will become apparent to those of ordinary skill in the art. Further, different advantageous aspects may provide different advantages as compared to other advantageous aspects. The example aspects selected are chosen and described in order to best explain the principles of the disclosure, the practical application, and to enable others of ordinary skill in the art to understand the disclosure with various modifications as are suited to the particular use contemplated.

What is claimed is:

1. A power generation system comprising:
a wind turbine in an interior of a building;
an intake positioned on one of a plurality of exterior surfaces of the building to direct wind incident on and traversing the one of the plurality of exterior surfaces of the building to the wind turbine in the interior of the building, wherein the intake is formed as a recessed opening in the one of the plurality of exterior surfaces, wherein the intake has an inwardly sloping surface with respect to the one of the plurality of exterior surfaces that forms the recessed opening and a gap between the inwardly sloping surface and the one of the plurality of exterior surfaces; and an air duct positioned in the interior of the building and coupling the intake to the wind turbine, wherein gap of the intake passes wind into the air duct, wherein the air duct extends substantially parallel to the one of the plurality of exterior surfaces, wherein the air duct includes one or more walls extending between a first end coupled to the intake and a second end coupled to the wind turbine, wherein the one or more walls of the air duct substantially enclose an inner space within the air duct, wherein the air duct compresses and accelerates the wind as the wind flows from the intake to the wind turbine.

2. The power generation system of claim 1, wherein the air duct includes one or more tapered sections that taper inwardly from the first end to the second end.

3. The power generation system of claim 2, wherein the air duct tapers continuously along an entire distance of the air duct.

4. The power generation system of claim 2, wherein the air duct has a linear taper of approximately 20 degrees.

5. The power generation system of claim 1, wherein the air duct is configured such that a cross-sectional dimension of the air duct is greater at the first end than at the second end so that the air duct acts as a fluid mechanics nozzle to compress and accelerate the wind.

6. The power generation system of claim 1, wherein the air duct is a straight run between the intake and the wind turbine without any elbows or turns.

7. The power generation system of claim 1, wherein the air duct includes one or more elbows or turns between the intake and the wind turbine.

8. The power generation system of claim 1, further comprising:
   exhaust duct coupled to the wind turbine for egress of the wind.

9. The power generation system of claim 8, further comprising:
   a heating, ventilating, and air conditioning (HVAC) system in the building and coupled to the exhaust duct.

10. The power generation system of claim 8, wherein the wind turbine comprises:
    a housing; and
    a centrifugal fan with a fan blade assembly in the housing, wherein the housing has an inlet for receiving the wind from the air duct and an outlet for exhausting air to the exhaust duct, and wherein the inlet is substantially perpendicular to the outlet.

11. The power generation system of claim 10, wherein the centrifugal fan further comprises:
    a brake system having a first state of operation in which the brake system is disengaged from the fan blade assembly to allow rotation of the fan blade assembly, and a second state of operation in which the brake system is engaged with the fan blade assembly to stop or prevent rotation of the fan blade assembly.

12. The power generation system of claim 1, wherein the intake is flush with the one of the plurality of exterior surfaces.

13. The power generation system of claim 1, wherein the intake further comprises:
    a scoop that protrudes from the one of the plurality of exterior surfaces to capture greater amounts of wind.

14. The power generation system of claim 1, further comprising:
    an intake filter configured to inhibit objects from entering the intake.

15. The power generation system of claim 1, wherein the intake is located at a corner of the building.

16. The power generation system of claim 1, further comprising:
    multiple intakes on one or more of the plurality of exterior surfaces of the building; and
    multiple air ducts positioned in the interior of the building and respectively coupling the multiple intakes to the wind turbine.

17. A method for generating electrical energy from wind, comprising:
    capturing wind in an intake positioned on one of a plurality of exterior surfaces of a building, wherein the intake is formed as a recessed opening in the one of the plurality of exterior surfaces, wherein the intake has an inwardly sloping surface with respect to the one of the plurality of exterior surfaces that forms the recessed opening and a gap between the inwardly sloping surface and the one of the plurality of exterior surfaces, wherein capturing the wind in the intakes comprises:
        receiving the wind into the recessed opening in the one of the plurality of exterior surfaces of the building; and
        passing the wind from the gap into an air duct;
    directing, via the air duct positioned in an interior of the building and extending substantially parallel to the one of the plurality of exterior surfaces, the wind from the intake to a centrifugal fan in an interior of the building, wherein the air duct includes one or more walls extending between a first end coupled to the intake and a second end coupled to the centrifugal fan, wherein the one or more walls of the air duct substantially enclose an inner space within the air duct, wherein the air duct compresses and accelerates the wind as the wind flows from the intake to a wind turbine;
    receiving, in the centrifugal fan, the wind from the air duct;
    rotating, via the received wind, a fan blade assembly in the centrifugal fan;
    generating electrical energy, via a generator, based on the rotation of the fan blade assembly; and
    exhausting the wind from the centrifugal fan in a direction that is perpendicular to a direction in which the wind is received in the centrifugal fan.

18. The method of claim 17, wherein directing, via the air duct positioned in the interior of the building, the wind from the intake to the centrifugal fan in the interior of the building comprises:
    directing the wind through one or more tapered sections that taper inwardly from the first end to the second end.

19. The method of claim 18, wherein directing the wind through one or more tapered sections that taper inwardly from the first end to the second end comprises:
    directing the wind through a continuously tapered section along an entire distance of the air duct.

20. The method of claim 17, capturing wind in the intake comprises:
    capturing wind in the intake that is flush with the one of the plurality of exterior surfaces.

* * * * *